US009632931B2

(12) United States Patent
Tajima et al.

(10) Patent No.: US 9,632,931 B2
(45) Date of Patent: Apr. 25, 2017

(54) COMPUTER SYSTEM AND MEMORY ALLOCATION ADJUSTMENT METHOD FOR COMPUTER SYSTEM

(71) Applicant: Hitachi, Ltd., Tokyo (JP)

(72) Inventors: Sachie Tajima, Tokyo (JP); Tadashi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 41 days.

(21) Appl. No.: 14/766,608

(22) PCT Filed: Sep. 26, 2013

(86) PCT No.: PCT/JP2013/075977
§ 371 (c)(1),
(2) Date: Aug. 7, 2015

(87) PCT Pub. No.: WO2015/045046
PCT Pub. Date: Apr. 2, 2015

(65) Prior Publication Data
US 2015/0378892 A1  Dec. 31, 2015

(51) Int. Cl.
*G06F 12/0802* (2016.01)
*G06F 9/50* (2006.01)
(Continued)

(52) U.S. Cl.
CPC ...... *G06F 12/0802* (2013.01); *G06F 9/45558* (2013.01); *G06F 9/5022* (2013.01); *G06F 12/0848* (2013.01); *G06F 2009/45583* (2013.01); *G06F 2212/152* (2013.01); *G06F 2212/6042* (2013.01)

(58) Field of Classification Search
None
See application file for complete search history.

(56) References Cited

U.S. PATENT DOCUMENTS 8,359,451 B2  1/2013  Chen et al.
2006/0288159 A1  12/2006  Haruna et al.
(Continued)

FOREIGN PATENT DOCUMENTS

JP  05-204760 A   8/1993
JP  2000-122906 A  4/2000
(Continued)

OTHER PUBLICATIONS

International Search Report of PCT/JP2013/075977.
(Continued)

*Primary Examiner* — Kevin Verbrugge
(74) *Attorney, Agent, or Firm* — Mattingly & Malur, PC

(57) ABSTRACT

In a computer system in which a virtualization control unit controls a plurality of virtual machines, if memory is collected regardless of a memory usage status of the virtual machine, cache miss increases and an IO performance of overall system deteriorates. In order to solve this problem, a usage status of a cache region within a memory which is utilized by each OS that the plurality of the virtual machines has, and based on a monitoring result, the virtualization control unit decides an allocation region of the memory as a collection target among the allocation region of the memory already allocated to each OS, and collects the allocation region of the memory as the collection target from the OS as a current allocation destination.

9 Claims, 10 Drawing Sheets

(51) Int. Cl.
   *G06F 9/455*     (2006.01)
   *G06F 12/0846*   (2016.01)

(56)              References Cited

U.S. PATENT DOCUMENTS

2010/0241785 A1    9/2010   Chen et al.
2010/0274947 A1   10/2010   Ohta et al.

FOREIGN PATENT DOCUMENTS

JP       2006-350780 A    12/2006
JP       2009-026117 A     2/2009
JP       2010-277581 A    12/2010
JP       2012-181569 A     9/2012

OTHER PUBLICATIONS

Japanese Office Action received in corresponding Japanese Application No. 2015-538691 dated Sep. 13, 2016.
Carl A. Waldspurger, Memory Resource Management in VMware ESX Server, In Proc. Fifth Symposium on Operating System Design and Implementation (OSDI '02), Dec. 2002.

FIG. 5

ADJUSTMENT HISTORY 309

| TIME | MACHINE ID | ADJUSTMENT AMOUNT |
|---|---|---|
| 1373529522 | MACHINE A | -3072 |
| | MACHINE B | -6144 |

Columns: 511, 512, 513

MEMORY MANAGEMENT TABLE 307

| MACHINE ID | START POSITION | END POSITION |
|---|---|---|
| MACHINE A | 0x000000 | 0x09d7ff |
| MACHINE B | 0x09d800 | 0x09ffff |
| MACHINE A | 0x0e0000 | 0x0fffff |
| UNUSED | 0x100000 | 0x1fffff |

Columns: 521, 522, 523

OVERALL CACHE MANAGEMENT TABLE 308

| TIME | MACHINE ID | ACTIVE CACHE | INACTIVE CACHE | HIT RATE |
|---|---|---|---|---|
| 1373529780 | MACHINE A | 9 | 4 | 52 |
| | MACHINE B | 2 | 8 | 5 |
| 1373529400 | MACHINE A | 10 | 6 | 67 |
| | MACHINE B | 4 | 12 | 6 |

Columns: 531, 532, 533, 534, 535

VIRTUAL MACHINE CONFIGURATION INFORMATION 223

| MACHINE ID | MINIMUM CACHE AMOUNT | FILE TYPE |
|---|---|---|
| MACHINE A | 4096 | VM |
| MACHINE B | --- | --- |

Columns: 541, 542, 543

POLICY 313

| FILE TYPE | FILE SIZE | ACCESS PATTERN | ACTION |
|---|---|---|---|
| VM | 8192~ | OPEN | REMOVE FROM MEMORY ADJUSTMENT TARGET FOR 300 SECONDS |

Columns: 551, 552, 553, 554

| ACTIVE CACHE 611 | INACTIVE CACHE 612 | HIT RATE 613 |
|---|---|---|
| 9 | 4 | 52 |

CACHE MANAGEMENT TABLE 404

COMPUTER SYSTEM AND MEMORY ALLOCATION ADJUSTMENT METHOD FOR COMPUTER SYSTEM

TECHNICAL FIELD

The present invention relates to an adjustment method of a memory amount allocated to a virtual computer.

BACKGROUND ART

A memory ballooning technology is for adjusting an allocation amount of a memory, by performing collection/allocation of the memory allocated to a virtual machine. For example, a virtualization control unit providing a virtual machine determines that the memory is overcollected, based on occurrence of a swap within the virtual machine and a monitoring result of the virtual machine. Further, there is a technology in which the virtualization control unit executes cancelling of the collection of the memory from the virtual machine or allocation of the memory (for example, PTL 1).

CITATION LIST

Patent Literature

[PTL 1] U.S. Pat. No. 8,359,451

SUMMARY OF INVENTION

Technical Problem

In the above-mentioned memory ballooning method, the collection of the memory is performed based on the occurrence of the swap within the virtual machine and the monitoring result of the virtual machine. However, a case is envisaged in which an IO performance deteriorates from an increase in a cache miss, by collecting the memory without taking a utilization status of the cache in the virtual machine into consideration.

Solution to Problem

A usage status of a cache region within a memory utilized by each OS which a plurality of virtual machines has is monitored, and a virtualization control unit decides an allocation region of a memory as a collection target among the allocation region of the memory already allocated to each OS based on the monitoring result, and collects the allocation region of the memory as the collection target from the OS as a current allocation destination.

Advantageous Effects of Invention

According to the present invention, it becomes possible to adjust the allocated memory amount, according to the usage status of the memory by the plurality of the virtual machines managed by the virtualization control unit, especially according to the usage status of the cache. By doing so, it becomes possible to alleviate the cache miss of overall system, and to prevent deterioration of IO performance.

BRIEF DESCRIPTION OF DRAWINGS

FIG. 5 is a view illustrating a specific example of an adjustment history, a memory management table, an overall cache management table, a virtual machine configuration information, and a policy, that a memory manager within the virtualization control unit illustrated in FIG. 3 has.

DESCRIPTION OF EMBODIMENTS

A configuration and functions and the like of the embodiment related to the present invention will be explained with reference to the drawings.
<Embodiment>

Figure 1:
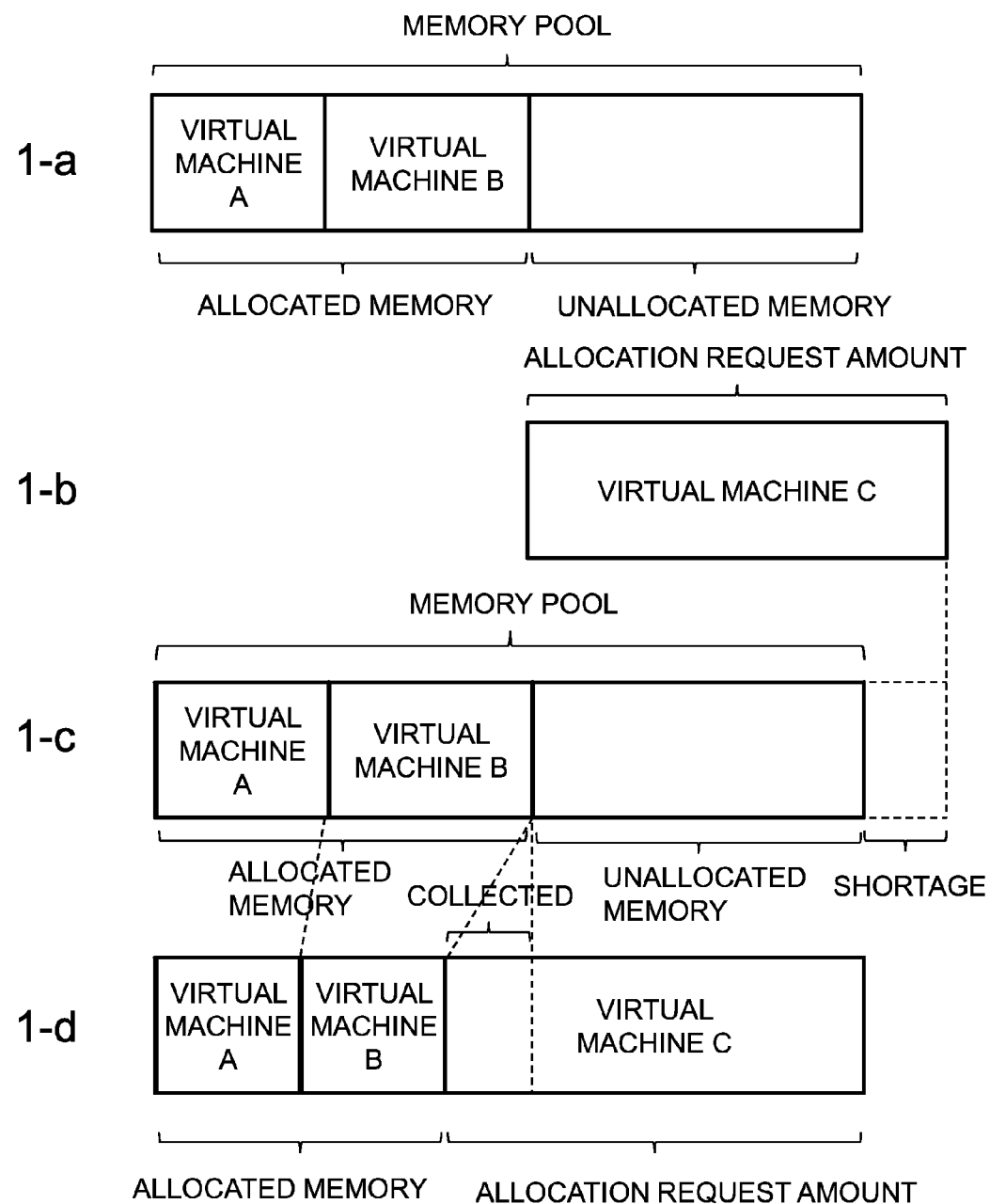
FIG. 1 is a view illustrating an allocation example of a memory in a memory pool that the virtualization control unit has.

FIG. 1 is a view showing an allocation example of a memory in a memory pool that a virtualization control unit has.

The virtualization control unit manages a memory capable of being allocated to a virtual machine managed by the virtualization control unit as a memory pool.

In FIG. 1, 1-*a* is a virtual machine managed by the virtualization control unit. In the figure, a state of the memory pool in a case where a virtual machine A and a virtual machine B are operating, is shown. A part of the memory managed by the memory pool is allocated to the virtual machine A and the virtual machine B as an allocated memory, and a remaining region which is not allocated to the virtual machine is an unallocated memory.

In FIG. 1, 1-*b* illustrates a state where a virtual machine C managed by the virtualization control unit is operated. In order to operate the virtual machine C, it is necessary to allocate a memory to the virtual machine C. A capacity of the memory to be allocated to the virtual machine C will be called an allocation request memory amount.

In FIG. 1, 1-c indicates that the unallocated memory amount managed by the memory pool is insufficient with respect to the allocation request memory amount requested in 1-b.

In FIG. 1, 1-d illustrates a state where a part of a region is collected from the memory allocated to the virtual machine A and the virtual machine B, in order to supplement the insufficiency revealed in 1-c. By adding the memory collected from the operating virtual machine to the unallocated memory, the unallocated memory amount managed by the memory pool may satisfy the allocation request memory amount requested in 1-b.

On the other hand, the collection of the memory from the operating virtual machine in 1-d must be performed while preventing deterioration of an IO performance of the overall system.

In some OS, in order to effectively exploit the memory with faster access speed compared to a disk, an unused memory region is used as a cache. The effect of the cache is small in a case where IO is performed to a wide region randomly, however, the effect of the cache becomes larger in a case where the IO is issued to a local region.

On the virtual machine, various operations are being performed. Some operation issues IO randomly to the wide region, and other operation issues IO to the local region. That is, a usage status of the cache differs with the operation being performed in the virtual machine.

As such, extra memory is collected more from the virtual machine which does not effectively exploit the cache, such as the virtual machine issuing IO to the wide region randomly, and make the cache capacity used by the virtual machine smaller. On the other hand, the collection volume of the memory from the virtual machine effectively exploiting the cache, such as the virtual machine issuing IO to the local region, is made smaller. As is explained above, by maintaining the cache volume used by the virtual machine, it becomes possible to alleviate a cache miss of overall system, and to prevent deterioration of IO performance, compared to a case where the memory is collected randomly.

According to the present embodiment, the virtualization control unit may collect the memory, according to the usage status of the cache in the virtual machine. As a result, it becomes possible to allocate the memory to the virtual machine, while preventing deterioration of the IO performance.

For example, in a case of installing a multi-tenant environment, it becomes possible to allocate overcommitted memory, and improve cost performance for a tenant provider, while preventing the deterioration of the IO performance in each tenant.

Figure 2:
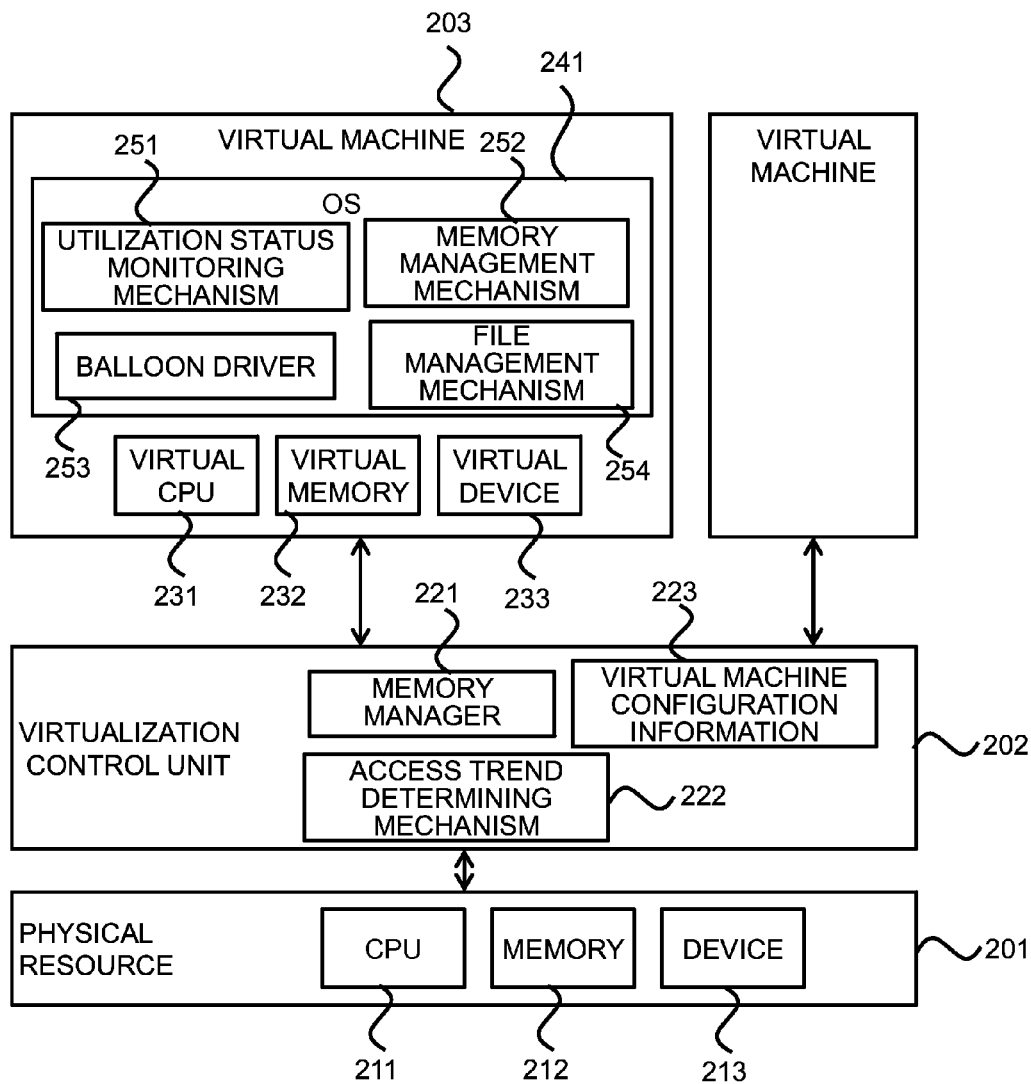
FIG. 2 is a view illustrating an overall configuration of a computer system according to the present invention.

FIG. 2 illustrates an overall configuration of a computer system related to the present embodiment. The computer system is configured from a physical resource 201, a virtualization control unit 202, and one or more virtual machines 203.

The physical resource 201 includes a CPU 211, a memory 212, and a device 213. The physical resource 201 may be stored in one chassis, or may be stored in a plurality of the chassis.

The virtualization control unit 202 is a mechanism which performs allocation of a physical resource to the managing virtual machine 203 being managed thereby, and corresponds to a hypervisor. For example, the virtualization control unit 202 has a memory manager 221 which is a mechanism performing the allocation of the memory to the virtual machine 203.

The virtual machine 203 has a virtual CPU 231, a virtual memory 232, and a virtual device 233 that are resources provided from the virtualization control unit 202. These may be resources emulated by the virtualization control unit 202, or the physical resource 201 may be directly allocated with an intermediary of the virtualization control unit 202. An OS 241 operates in the virtual machine 203. The OS 241 has a memory management mechanism 252 which manages the virtual memory 232 allocated to the OS 241.

The IO executed on the OS 241 is issued to the virtual device 233 via a file management mechanism 254. The OS stores the result of the IO once issued with respect to a device, to an unused region among the virtual memory 232 which is recognized by the OS. As is explained above, a region of the virtual memory used for temporary storage of the data is called a cache. The virtual memory is utilized for, other than the cache usage, for example, storing destination of information that the OS or an application operating on the OS uses.

By caching the data, the IO to the device region from next time onwards may be performed by accessing the cache, without accessing the device. Since an access response speed of the memory is faster than a response speed of the device, the IO performance of the OS increases as the IO hits the cache. In order to increase the probability of the IO hitting the cache, the OS uses almost all region of the memory free space as the cache.

The probability of the IO hitting the cache differs with a workload operating on the OS. In a case of the workload of accessing the wide region randomly, it is difficult for the IO to hit the cache, and in a case of the workload of accessing the local region, it is easy for the IO to hits the cache. On the other hand, taking into consideration a nature that the region of the virtual memory utilized for other than the cache usage hardly varies as is explained above, then as the allocated memory region becomes larger, the region the OS may use as the cache increases.

As is explained above, by allocating larger volume of memory to the OS on which the latter workload is operating than the OS on which the former workload is operating, larger volume of cache is allocated to the latter OS than the former OS, so that the IO performance of the overall system improves.

To the OS 241, a utilization status monitoring mechanism 251 which is a mechanism for monitoring a usage status of the cache as a part region of the virtual memory 232, and a file access state, is stored.

Further, upon receiving a utilization status monitoring request of the cache from the virtualization control unit 202, the virtual machine 203 obtains the utilization status of the cache from the file management mechanism 254 by the utilization status monitoring mechanism 251, and notifies the same to the memory manager 221 of the virtualization control unit 202. The utilization status monitoring process may be performed periodically without the monitoring request.

The memory manager 221 summarizes the usage status of the cache notified from the plurality of the virtual machines 203 that are managed by the virtualization control unit 202, and after comparing the same with information on a minimum cache amount that is stored in a virtual machine configuration information 223, collects the memory preferentially from the virtual machine that is not utilizing the cache effectively.

For example, when the memory becomes necessary, such as when starting a new virtual machine, the virtualization control unit 202 secures the necessary amount of memory from the unallocated region of the memory pool. In a case where the capacity of the unallocated region does not satisfy the necessary amount, the memory is collected from the operating virtual machine 203, via a balloon driver 253 which the OS 241 of the virtual machine 203 has. Upon collecting the memory, the virtualization control unit 202 confirms the utilization status of the cache of the virtual machine 203, and decides the virtual machine as a collection target of the memory, and a collection amount of the memory with respect to each virtual machine.

In a case where a file type is set to the virtual machine configuration information 223, an access trend determining mechanism 222 issues a file access trend monitoring request to the virtual machine 203. The virtual machine 203 monitors the file access in the virtual machine 203, by the utilization status monitoring mechanism 251. In a case where an access satisfying the request is generated, the result is notified to the virtualization control unit 202. The virtualization control unit 202 controls the collection process of the memory, based on the result.

Figure 3:
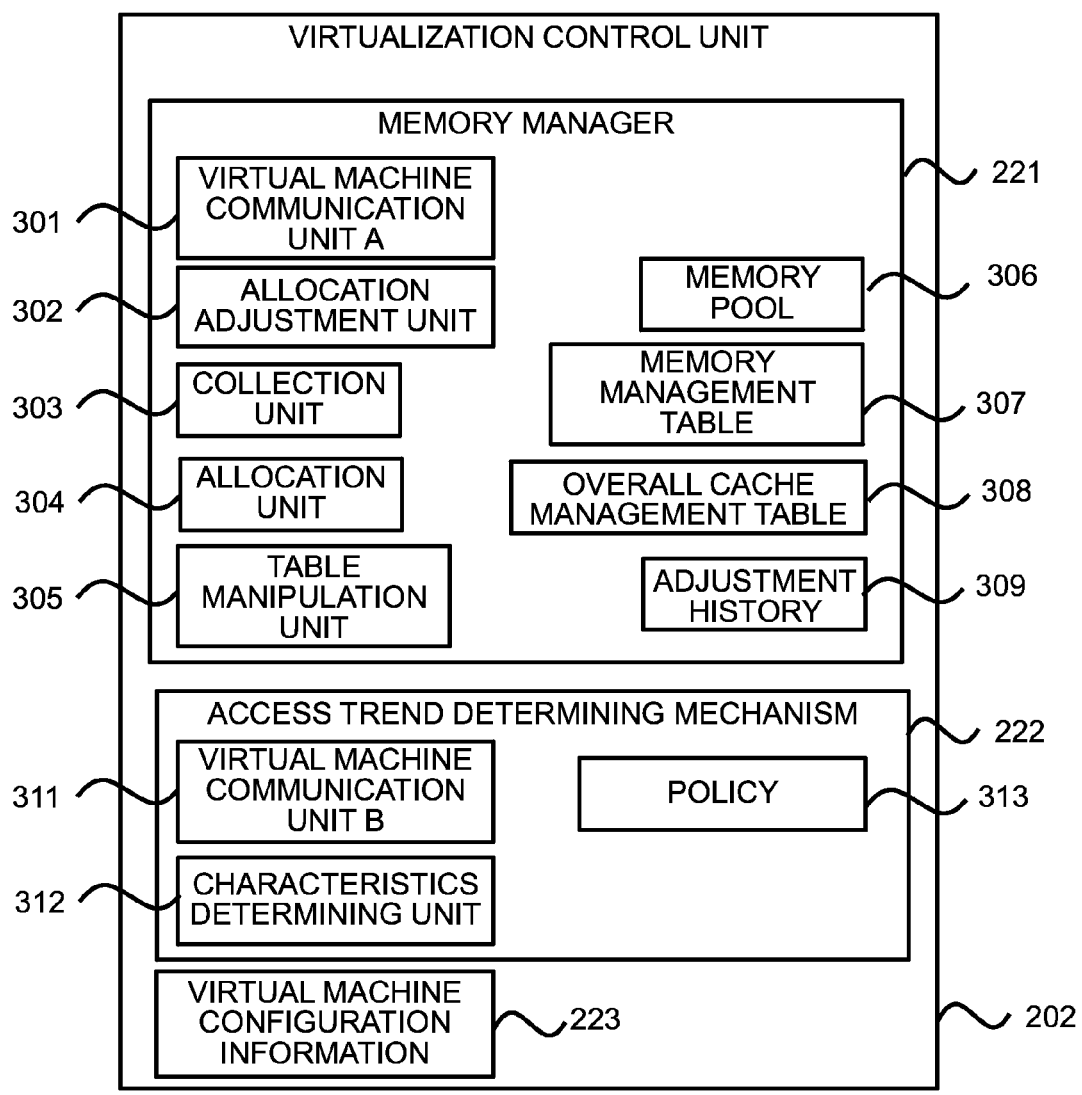
FIG. 3 is a view illustrating a configuration view of a virtualization control unit, among the overall configuration illustrated in FIG. 2.

FIG. 3 illustrates a configuration of the virtualization control unit 202.

The virtualization control unit 202 has the memory manager 221, the access trend determining mechanism 222, and the virtual machine configuration information 223.

The memory manager 221 has a virtual machine communication unit A 301, an allocation adjustment unit 302, a collection unit 303, an allocation unit 304, a table manipulation unit 305, a memory pool 306, a memory management table 307, an overall cache management table 308, and an adjustment history 309.

The access trend determining mechanism 222 has a virtual machine communication unit B 311, a characteristics determining unit 312, and a policy 313.

Figure 4:
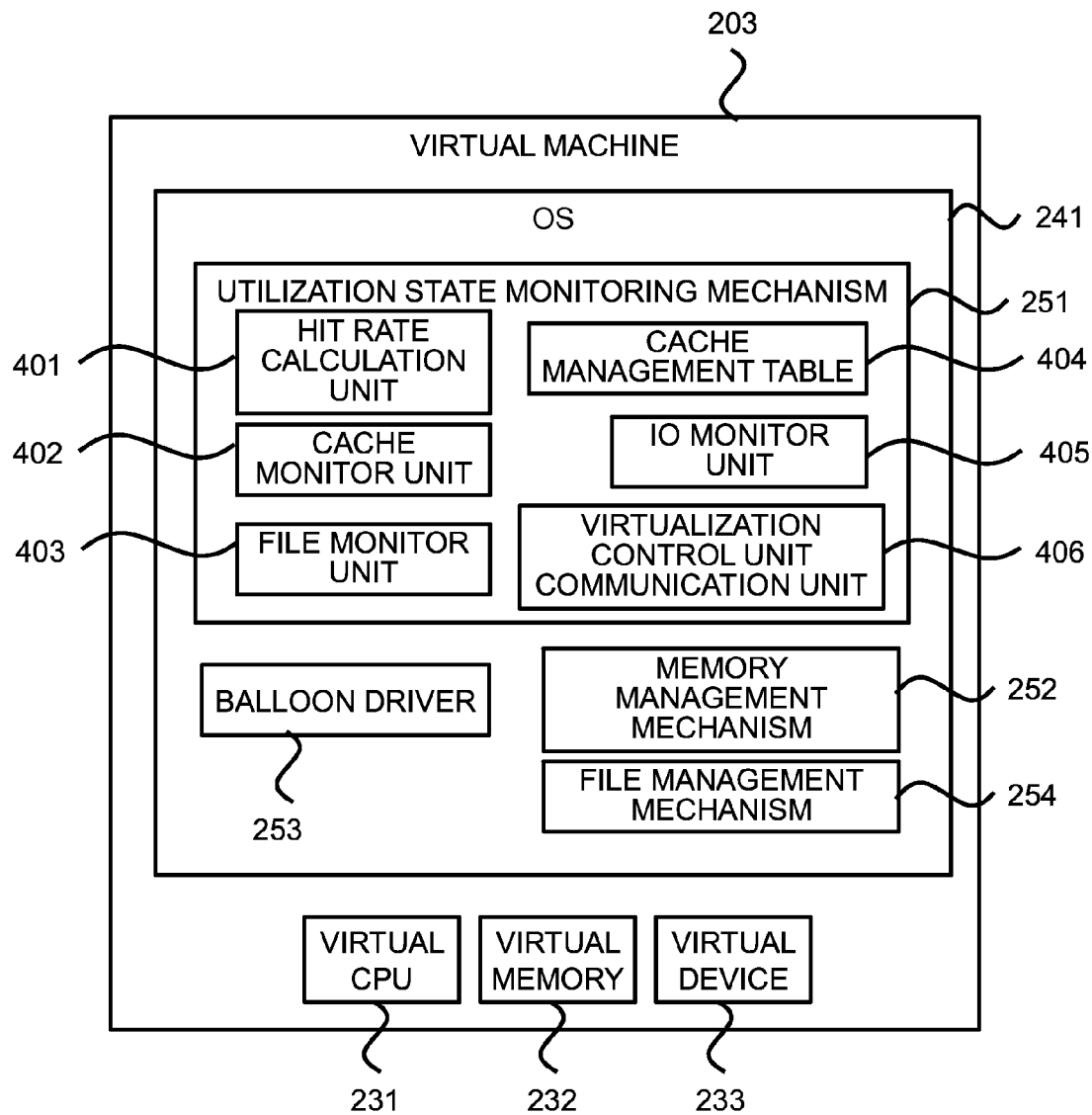
FIG. 4 is a view illustrating a configuration view of a virtual machine, among the overall configuration illustrated in FIG. 2.

FIG. 4 illustrates the configuration of the virtual machine 203.

The virtual machine 203 has the virtual CPU 231, the virtual memory 232, the virtual device 233, and the OS 241.

The OS 241 has the utilization status monitoring mechanism 251, the memory management mechanism 252, the balloon driver 253, and the file management mechanism 254. The utilization status monitoring mechanism 251 is stored with a hit rate calculation unit 401, a cache monitor unit 402, a file monitor unit 403, a cache management table 404, an IO monitor unit 405, and a virtualization control unit communication unit 406.

In FIG. 5, specific examples of the adjustment history 309, the memory management table 307, and the overall cache management table 308 that the memory manager 221 has, the virtual machine configuration information 223, and the policy 313 that the access trend determining mechanism 222 has, respectively, in the virtualization control unit 202, are shown.

The adjustment history 309 is stored with a history information of performing the adjustment of the memory allocation amount, to the virtual machine that is managed by the virtualization control unit 202. A time when the adjustment of the memory allocation amount is performed is stored in 511, a machine ID which is an identifier of the virtual machine to which the adjustment of the memory allocation amount is performed is stored in 512, and the adjustment amount of the memory allocation amount is stored in 513, respectively. As a sign of the adjustment amount, a case of a positive value indicates that the allocation of the memory is performed, and a case of a negative value indicates that the collection of the memory is performed, are shown. For example, 510 in the figure indicates that, at time 1373529522, a memory of a size 3072 (negative) is collected from the virtual machine identified as the machine A.

To the memory management table 307, information indicating the allocation status of the region to the virtual machine, in the memory pool 306 that is managed by the virtualization control unit 202, is stored. The machine ID as the identifier of the virtual machine to which the memory is allocated is stored in 521, a start position of a memory region allocated to the virtual machine identified in 521 is stored in 522, and an end position thereof is stored in 523, respectively. For example, 520 in the figure indicates that the virtual machine identified as the machine A is allocated with the memory region from 0x000000 to 0x09d7ff. The region which is not allocated to the virtual machine within the memory pool 306 is stored to the memory management table 307 with the machine ID 521 set to unused.

The overall cache management table 308 is stored with information indicating the cache usage status of the virtual machine that is managed by the virtualization control unit 202. The time when the cache information is obtained is stored in 531, the machine ID which is the identifier of the virtual machine is stored in 532, an active cache indicating the capacity of the active cache is stored in 533, an inactive cache indicating the capacity of an inactive cache is stored in 534, and the cache hit rate is stored in 535, respectively. For example, 530 in the figure indicates that, at a time point of time 1373529780, the active cache capacity of the virtual machine identified as the machine A is 9, the inactive cache capacity is 4, and the cache hit rate is 52.

The virtual machine configuration information 223 is stored with a SLA (Service Level Agreement) request to the virtual machine that is managed by the virtualization control unit 202. The machine ID identifying the virtual machine which is a warrant target of the SLA is stored in 541, a minimum cache capacity to be allocated to the virtual machine is stored in 542, and a type of a file to be stored in the virtual machine is stored in 543, respectively. For example, 540 in the figure indicates that the minimum amount of the cache amount to be allocated to the virtual machine identified as the machine A is 4096, and the type of the file stored in the virtual machine is VM.

The policy 313 is stored with a parameter used for determination of the file type, and an action upon determination. The file type used for identification of the policy is stored in 551, the file size as one of the parameters for determining the characteristics of the file is stored in 552, an access pattern as one of the parameters for determining the characteristics of the file is stored in 553, and a content of the action executed in a case where a condition is satisfied is stored in 554, respectively. For example, 550 in the figure indicates that the policy specified by the file type VM is that, in a case where the file with a size of 8192 or more is opened by a certain virtual machine, the virtual machine is removed from a memory adjustment target for 300 seconds. In the present embodiment, the file size and the access pattern are stored in the policy 313 as the parameters for determining the file characteristics. However, other values such as an access frequency and an access size and the like may be used as the parameter.

Figures 6, 7:
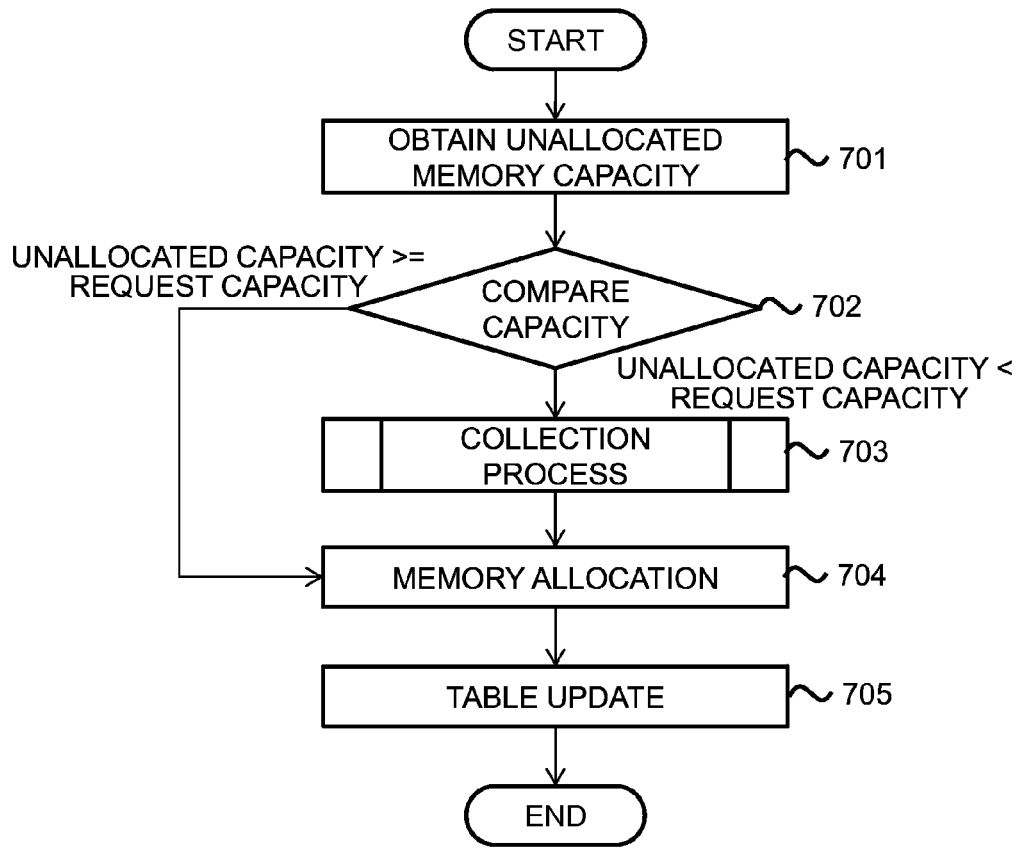
FIG. 6 is a view illustrating an example of the cache management table that a utilization status monitoring mechanism within the virtual machine illustrated in FIG. 4 has.
FIG. 7 is a view illustrating a flow chart of a memory allocation process executed by a memory manager of the virtualization control unit.

FIG. 6 illustrates a specific example of the cache management table 404, which is stored in the utilization status monitoring mechanism 251 that the OS 241 of the virtual machine 203 has. The cache management table 404 stores information indicating a cache usage status of the virtual machine. In the cache management table 404, the active cache indicating the capacity of the active cache is stored in 611, the inactive cache indicating the capacity of the inactive cache is stored in 612, and the cache hit rate is stored in 613, respectively. For example, 610 in the figure indicates that the active cache capacity at the virtual machine with the cache management table 404 is 9, the inactive cache capacity is 4, and the cache hit rate is 52.

FIG. 7 illustrates a memory allocation process flow by the memory manager 221 of the virtualization control unit 202.

The virtualization control unit 202 requires securing the memory, triggered by an occurrence of an event such as a creation of a new virtual machine. Here, the capacity of the memory that is required to be secured is called a secure request capacity. The secure request capacity may be obtained, for example, from a configuration file of the new virtual machine to be created.

In step 701, the allocation unit 304 scans the memory management table 307, and obtain the unallocated memory capacity by adding the size of the region in which the machine ID is unused.

In step 702, the allocation unit 304 compares the unallocated memory capacity and the secure request capacity.

In step 703, in a case where the secure request capacity is larger than the unallocated memory capacity, the collection process of the memory is executed. The details of the collection process of the memory will be explained later.

In a case where the secure request capacity is equal to or smaller than the unallocated memory capacity in the earlier step 702, or after execution of the collection process in step 703, the allocation unit 304 allocates the memory of the request capacity to the newly created virtual machine, in step 704.

In step 705, the table manipulation unit 305 changes the machine ID 521 corresponding to the allocated region in the memory management table 307 to the ID identifying the newly created virtual machine to which the memory is allocated, and the adjustment history 309 is stored with the current time, the ID of the virtual machine to which the memory is allocated, and stores the memory allocation amount as the adjustment amount.

Figure 8:
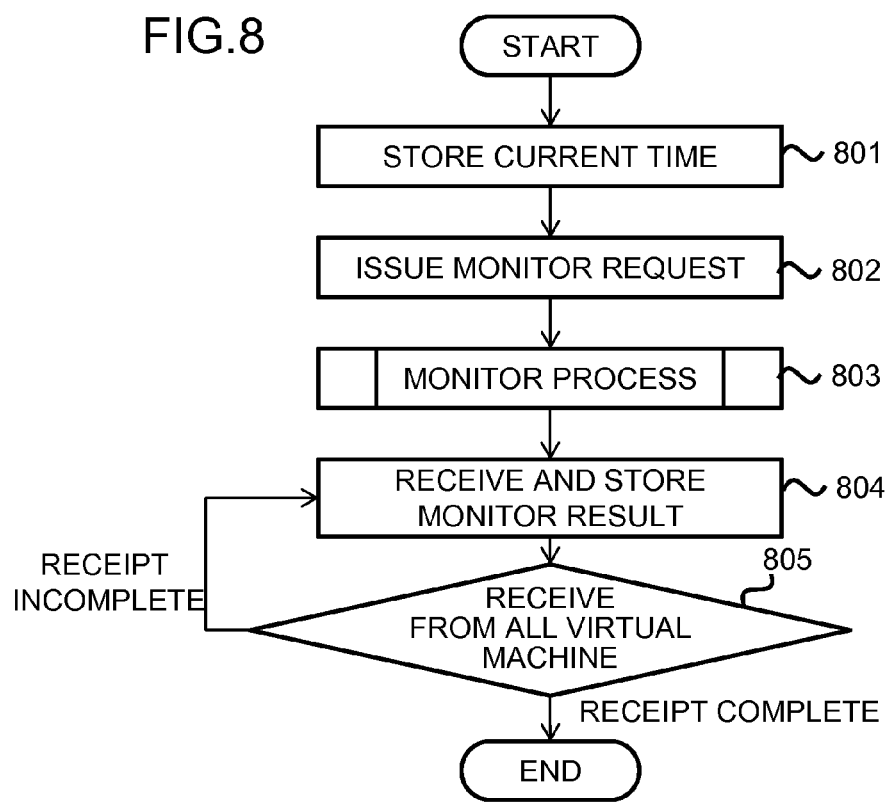
FIG. 8 is a view illustrating a process flow chart of creating overall cache management table executed by the memory manager of the virtualization control unit.

FIG. 8 illustrates a creation process flow of the overall cache management table 308 by the memory manager 221 of the virtualization control unit 202. The current process flow is executed, in a case where the collection request of the memory is generated in step 703 of the memory allocation process flow (FIG. 7). Further, the flow may be executed periodically.

In step 801, the table manipulation unit 305 obtains the current time, and stores the same in the time 531 of the overall cache management table 308.

In step 802, the virtual machine communication unit A 301 issues a cache monitoring request to all virtual machines that are memory allocation adjustment targets. Basically, the virtual machines managed by the virtualization control unit 202 are all memory allocation adjustment targets. However, virtual machines relevant to a SLA correspondence to be explained later or virtual machines relevant for other reasons may be removed from the adjustment target.

The monitoring process of step 803 is executed by the virtual machine 203 which received the monitoring request in step 802. The process flow thereof will be explained later.

In step 804, the virtual machine communication unit A 301 receives monitoring result from the virtual machine 203, and the table manipulation unit 305 stores the active cache, the inactive cache, and the cache hit rate (that is, the information of the cache management table 404 (FIG. 6)) that are the received monitoring results, and the machine ID of the virtual machine transmitting these results, to the overall cache management table 308.

In step 805, the virtual machine communication unit A 301 confirms whether the monitoring result is received from all virtual machines as the memory allocation adjustment target, and in a case where any virtual machine from which the monitoring result has not been received exists (receipt incomplete), returns to step 804 and waits for the reception of the monitoring result, and in a case where the monitoring result is received from all the virtual machines (receipt complete), ends the process.

Figure 9:
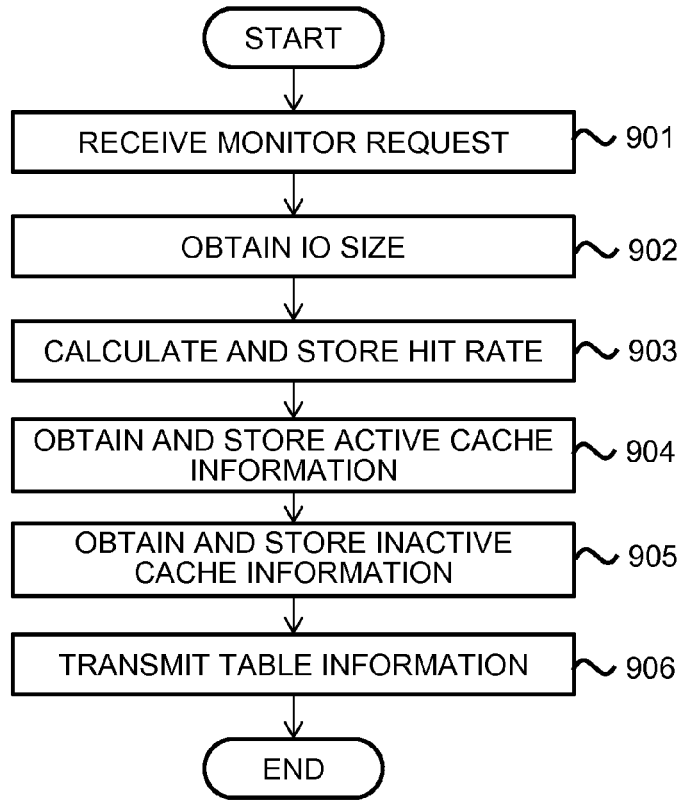
FIG. 9 is a view illustrating a flow chart of a monitoring process executed by the utilization state monitoring mechanism of the virtual machine.

FIG. 9 illustrates the monitoring process flow (step 803 of the creation process flow of the overall cache management table 308 (FIG. 8)) by the utilization status monitoring mechanism 251 of the virtual machine 203.

In step 901, the virtualization control unit communication unit 406 receives the monitoring request issued by the virtualization control unit 202, in step 802 of the creation process flow of the overall cache management table 308 (FIG. 8).

In step 902, the IO monitor unit 405 monitors the IO request to the file management mechanism 254, and the IO request to the virtual device 233, for a constant period. Of the IO requests received by the file management mechanism 254, a part of IO hits the cache, so that it becomes possible to obtain the IO request result, without issuing the IO request to the virtual device 233. As such, a difference between the IO request amounts to the file management mechanism 254 and to the virtual device 233 may be determined as a cache-hit IO request amount. A total amount of an IO size which is issued with respect to the file management mechanism 254 within the constant period (hereinafter referred to as "IO1"), and a total amount of the IO size issued with respect to the virtual device 233 within the constant period (hereinafter referred to as "IO2") are obtained.

In step 903, the hit rate calculation unit 401 calculates the cache hit rate, based on the total amount of the IO size IO1 which is issued with respect to the file management mechanism 254 and the total amount of the IO size IO2 which is issued with respect to the virtual device 233, that are obtained in step 902. Specifically, the cache hit rate is calculated by {(IO1-IO2)/IO1}. The calculated value is stored in the cache hit rate 613 of the cache management table 404 (FIG. 6).

Steps 902 and 903 may be executed periodically, asynchronous from step 901.

In step 904, the cache monitor unit 402 monitors the file management mechanism 254, obtains a list length of the cache being used, and stores the same as the active cache 611 in the cache management table 404 (FIG. 6).

In step 905, the cache monitor unit 402 monitors the file management mechanism 254, obtains the list length of the cache not being used, and stores the same as the inactive cache 612 in the cache management table 404 (FIG. 6).

The information obtained in steps 904 and 905 may not be the list length information, as long as it is information indicating the usage status of the active cache and the inactive cache.

In step 906, the virtualization control unit communication unit 406 transmits the information of the created cache management table 404 as the monitoring result to the virtualization control unit 202.

Figure 10:
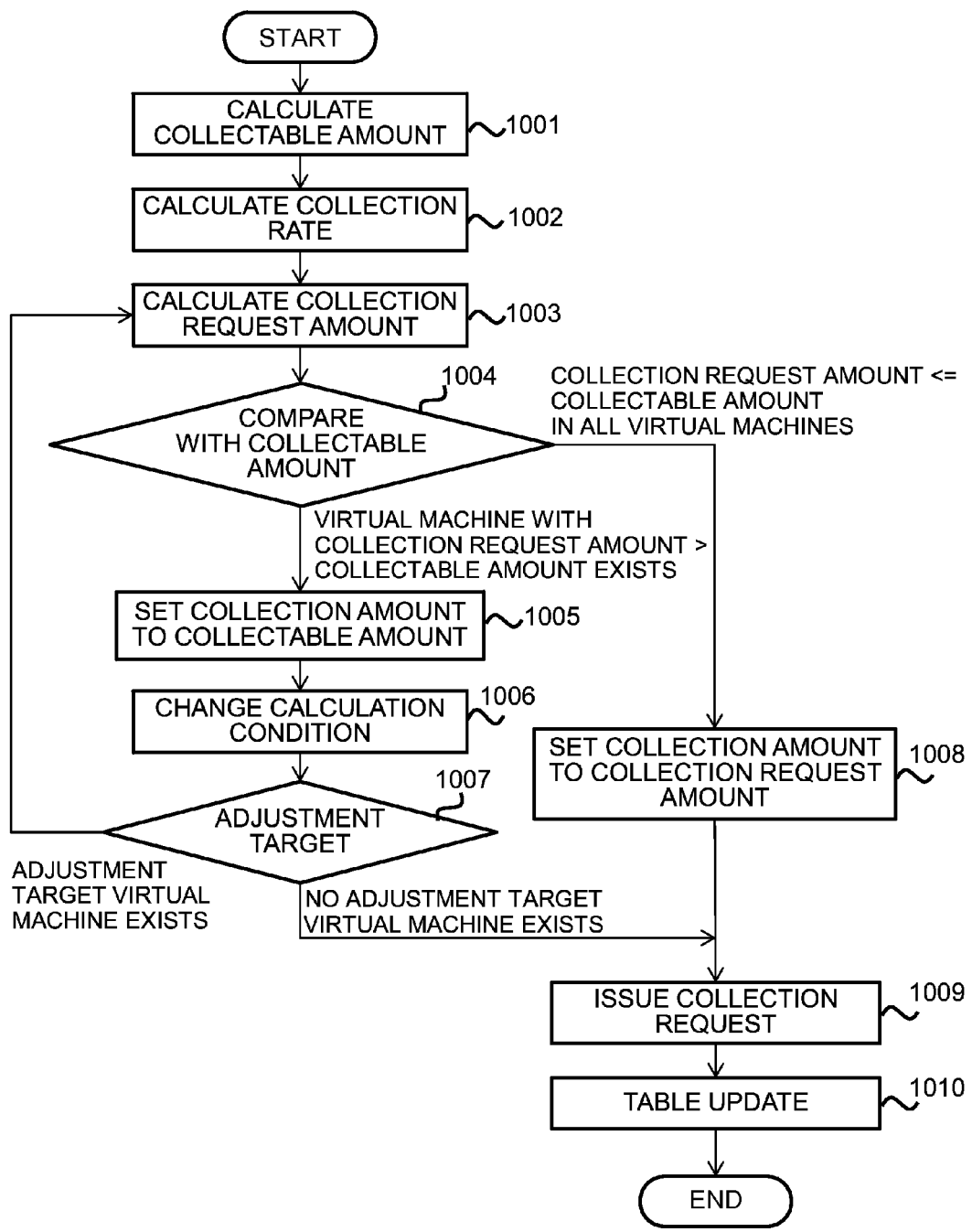
FIG. 10 is a view illustrating a flow chart of a judgment process of a memory collection source and collection amount executed by the memory manager of the virtualization control unit.

FIG. 10 illustrates a decision process flow of a collection source and the collection amount of the memory, by the memory manager 221 of the virtualization control unit 202.

The present process flow is executed in step 703 of the memory allocation process flow (FIG. 7). Further, in a case where the creation process of the overall cache management table 308 (FIG. 8) is executed triggered by the collection request of the memory in step 703, then the present process is executed after execution of the creation process of the overall cache management table 308.

In step 1001, the collection unit 303 confirms the minimum cache amount 542 of the virtual machine configuration information 223 and the active cache 533 and the inactive cache 534 of the overall cache management table 308, and calculates a collectable amount of the memory of each virtual machine as the memory allocation adjustment target. Specifically, the collectable memory amount is calculated by {(collectable amount of memory)=(total cache amount calculated from active cache and inactive cache)−(minimum cache amount)}.

In step 1002, the collection unit 303 confirms the time 531 stored in the overall cache management table 308, obtains the inactive cache of all virtual machines registered at most recent time, and calculates a collection rate of the memory. As a specific example, in a case where an inactive list length of the virtual machine A is 6, and the inactive list length of the virtual machine B is 12, then the memory is to be collected from the virtual machine A and the virtual machine B, in a ratio of 6:12=1:2, as the collection rate of the memory.

In step 1003, the collection unit 303 calculates an amount requested to be collected (hereinafter called a collection request amount) of the memory, according to the collection rate of the memory of each virtual machine as the memory allocation adjustment target that is calculated in step 1002. In the specific example mentioned above, in a case where the collection of 3 GB of the memory is necessary, the collection request amount to the virtual machine A is 1 GB, and the collection request amount to the virtual machine B is 2 GB, from the collection rate of 1:2 of the virtual machine A and the virtual machine B.

In step 1004, the collection unit 303 compares the collectable amount of the memory obtained in step 1001 and the collection request amount of the memory obtained in step 1003, for each virtual machine as the memory allocation adjustment target.

As a result of the comparison, in a case where there is a virtual machine in which the collection request amount is larger than the collectable amount, then in step 1005, the collection unit 303 sets the collection amount of the virtual machine to the collectable amount. In the specific example mentioned above, the collection request amount of the virtual machine B is 2 GB, and in a case where the collectable amount of the virtual machine B is 1.8 GB, then the collection amount of the memory of the virtual machine B is set to 1.8 GB.

In step 1006, the collection unit 303 changes a collection request amount calculation condition. The collection unit 303 excludes the virtual machine to which the setting of the collection amount is performed in step 1005 from the virtual machines as the memory allocation adjustment target, and subtracts the collection amount of the memory which is set in step 1005 from the necessary collection amount of the memory. In the above-mentioned specific example, the virtual machine B is excluded from the memory allocation adjustment target, and the collection amount of the memory is changed from 3 GB to 1.2 GB by subtracting the collection amount of 1.8 GB of the virtual machine B.

In step 1007, the collection unit 303 confirms whether the virtual machine as the memory allocation adjustment target is remaining. If there is no virtual machine as the memory allocation adjustment target remaining, then the process transits to step 1009, in order to request collection to the virtual machines to which the collection amount is set at that time point. On the other hand, in a case where the virtual machine as the memory allocation adjustment target remains, the process returns to step 1003 using the condition changed in step 1006, and continues the process.

In a case where, as a result of comparison in step 1004, the collectable amount is larger than the collection request amount in all virtual machines, then in step 1008, the collection unit 303 sets the collection amount of each virtual machine to the collection request amount.

In step 1009, the virtual machine communication unit A 301 issues the collection request of the memory by the collection amount set in step 1005 or step 1008, to each virtual machine. The virtual machine 203 collects the memory of the requested capacity using the balloon driver 253, and notifies to the virtualization control unit 202. A memory collection process may be executed, for example using the method disclosed in PTL1. Specifically, the balloon driver 253 secures the memory of the requested capacity. The region secured thereby becomes a region which is not used by other applications running on the virtual machine or for the cache. The present region is notified as a collectable region to the virtualization control unit 202.

In step 1010, the virtual machine communication unit A 301 receives already collected memory region information which is notified from each virtual machine. The table manipulation unit 305 changes, for the memory region collected from each virtual machine, the machine ID corresponding to the collected region in the memory management table 307 to unused, and the adjustment history 309 stores the current time, the ID of the virtual machine, and stores the collection amount as the adjustment amount.

From the process explained above, it becomes possible to fulfil the necessary secure request capacity by collecting the memory from the operating virtual machines, in a case where the secure request capacity of the memory necessary for creating the new virtual machine and the like is insufficient. In the present method, the memory collection is performed according to the cache usage status of each virtual machine. Therefore, it becomes possible to reduce influence to the performance of the overall system, by realizing the memory collection from the virtual machine with low necessity, while securing the performance of the operating virtual machine.

Figure 11:
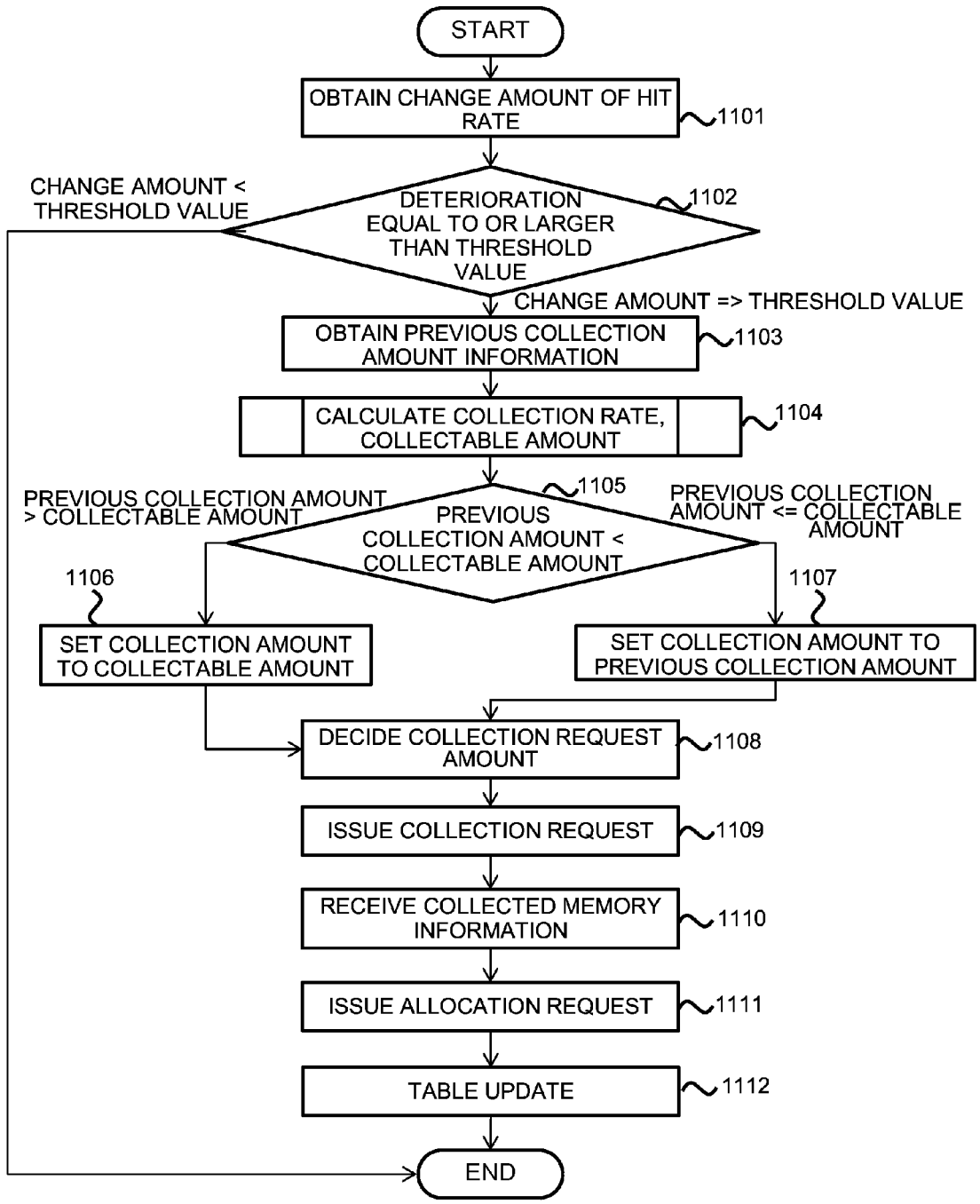
FIG. 11 is a view illustrating a flow chart of a memory balancing allocation process executed by the memory manager of the virtualization unit.

FIG. 11 illustrates a memory balance allocation process flow by the memory manager 221 of the virtualization control unit 202. The present process flow is executed periodically, in order to improve the cache hit rate of the overall system. Further, the process flow may be executed by the designation of the user and the like.

In step 1101, the allocation adjustment unit 302 obtains a change amount of the cache hit rate of each virtual machine that is stored in the overall cache management table 308. The change amount is calculated by subtracting a most recent cache hit rate from a previous cache hit rate. For example, from time 1373529400 to 1373529780 in the overall cache management table 308 (FIG. 5), the change amount of the cache hit rate of the virtual machine A is 15 (=67−52), and the change amount of the cache hit rate of the virtual machine B is 1 (=6−5).

In step 1102, the allocation adjustment unit 302 compares, among the change amount of the hit cache rate of each virtual machine obtained in step 1101, a value having a maximum change amount with a threshold value. In the virtual machine with large change amount, the performance is largely deteriorated from previous memory collection, or the performance is largely improved by the memory allocation. That is, the virtual machine with large change amount is said to be an environment in which the influence of the memory collection/allocation easily affects the performance. In a case where the change amount is larger than the threshold value, the process proceeds to step 1103, and in a case where the threshold value is larger than the change amount, the present process flow is ended. For example, in a case where the threshold value is set to 12, then the change amount of the cache hit rate of the virtual machine A (=15) is equal to or larger than the threshold value, so that the process proceeds to step 1103. The threshold value is set preliminarily, and the user may provide the same.

In step 1103, for the virtual machine with the change amount of the cache hit rate equal to or larger than the threshold value, the allocation adjustment unit 302 obtains the total amount of the adjustment amount of the memory, that is executed in the period in which the change amount of the cache hit rate is obtained in step 1101, from the adjustment history 309, and sets the same as a previous collection amount. For example, during the time 1373529400 to 1373529780 which is a period in which the change amount of the cache hit rate is obtained in step 1101, it is understood from the adjustment history 309 (FIG. 5) that the memory of 3072 is collected from the virtual machine A at the time 1373529522. This value 3072 is set as the previous collection amount.

In step 1104, the collection unit 303 executes steps 1001 and 1002 in the decision process flow of the memory collection source and the collection amount (FIG. 10), and calculates the collectable amount and the collection rate of the memory of each virtual machine as the memory allocation adjustment target.

In step 1105, the collection unit 303 compares the previous collection amount obtained in step 1103 with the total amount of the collectable amount of the memory calculated in step 1104. In a case where the previous collection amount is larger than the collectable amount, then the collection amount is set to the collectable amount in step 1106, and in a case where the collectable amount is larger than the previous collection amount, then the collection amount is set to the previous collection amount in step 1107.

In step 1108, the collection unit 303 decides the collection request amount of the memory with respect to each virtual machine, based on the collection rate of the memory calculated in step 1104, and the collection amount set in step 1106 or 1107.

In step 1109, the virtual machine communication unit A 301 issues the collection request of the memory to each virtual machine, similar to step 1009 of the decision process flow of the memory collection source and collection amount (FIG. 10).

In step 1110, the virtual machine communication unit A 301 receives the collected memory region information which is notified from each virtual machine.

In step 1111, the allocation unit 304 issues a request for allocating the memory collected in step 1110 with respect to the virtual machine in which the change amount of the cache hit rate is equal to or larger than the threshold value in step 1102.

In step 1112, the table manipulation unit 305 changes the machine ID of the memory region collected in step 1109 in the memory management table 307 to the virtual machine ID to which the memory is allocated in step 1111. The adjustment history 309 is stored with the current time, and the ID of the virtual machine to which the collection and the allocation of the memory is performed, and stores the collected amount of the allocated memory as the adjustment amount.

With the process explained above, it becomes possible to allocate the memory collected from the virtual machine with low cache hit rate to the virtual machine with high cache hit rate, and to improve the cache hit rate of the overall system.

Figure 12:
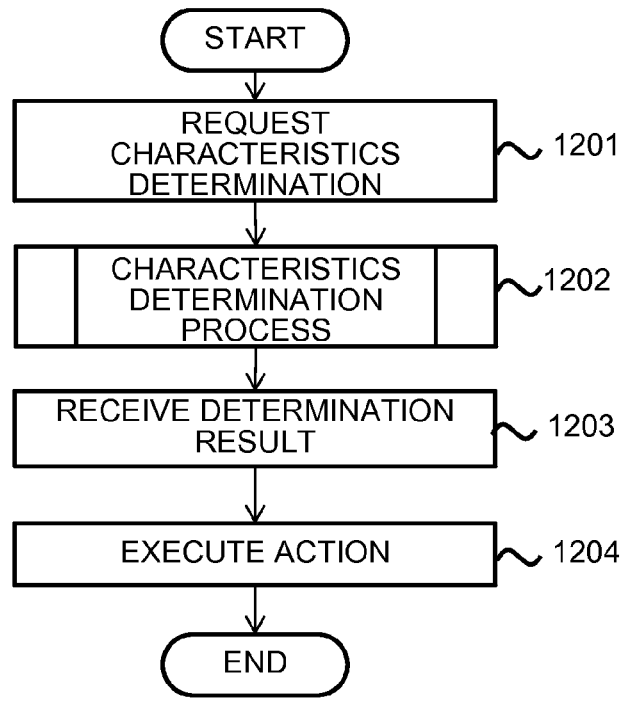
FIG. 12 is a view illustrating a flow chart of a SLA correspondence process executed by an access trend determining mechanism of the virtualization control unit.

FIG. 12 illustrates a SLA correspondence process flow by the access trend determining mechanism 222 of the virtualization control unit 202.

In step 1201, the characteristics determining unit 312 obtains the corresponding file size 552 and access pattern 553 from the policy 313, in a case where the file type 543 of the virtual machine is set in the virtual machine configuration information 223 during starting of the virtual machine, or in a case where a file type information with respect to the operating virtual machine is set, according to the file type. The virtual machine communication unit B 311 requests a characteristics determination with respect to the virtual machine 203 identified by the virtual machine ID 541 stored in the virtual machine configuration information 223, and transmits the file size and the access pattern as the parameter for determination.

In step 1202, the virtual machine 203 receiving the characteristics determination request executes the characteristics determination process. The process flow will be explained later.

In step 1203, the virtual machine communication unit B 311 receives a characteristics determination result from the virtual machine 203 which performed the characteristics determination process.

In step 1204, the characteristics determining unit 312 executes the action 554 listed in the policy 313 by referring to the policy 313 on the basis of the characteristics determination result. For example, in a case where the virtual machine A satisfied the characteristics of a file type VM, then the virtual machine A is removed from the memory allocation adjustment target for 300 seconds.

Figure 13:
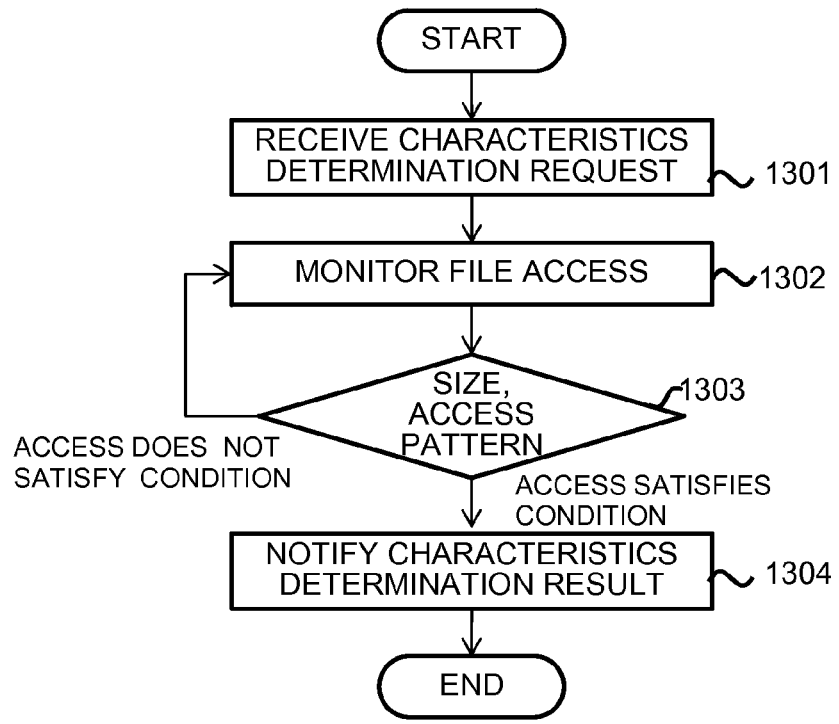
FIG. 13 is a view illustrating a flow chart of a characteristics determining process within the SLA correspondence process executed by the utilization state monitoring mechanism (mainly, file monitor unit) of the virtual machine.

FIG. 13 illustrates the characteristics determination process flow (step 1202 of the SLA correspondence process flow (FIG. 12)) by the utilization status monitoring mechanism 251 (mainly the file monitor unit 403) of the virtual machine 203.

In step 1301, the virtualization control unit communication unit 406 receives the characteristics determination request and the file size and the access pattern as parameters for the characteristics determination, that are transmitted from the virtualization control unit 202 in step 1201 of the SLA correspondence process flow (FIG. 12).

In step 1302, the file monitor unit 403 monitors the file access.

In step 1303, when the file access is generated, the file monitor unit 403 confirms whether the access satisfies the condition of the file size and the access pattern that are transmitted from the virtualization control unit 202. In a case where the access does not satisfy the condition, the process returns to step 1302. In a case where the access satisfies the condition, then in step 1304, the virtualization control unit communication unit 406 notifies that the file characteristics is satisfied to the virtualization control unit 202 as the characteristics determination result.

With the process explained above, it becomes possible to adjust the memory allocation amount according to the characteristics of the virtual machine. For example, a virtual machine in which a cache access tendency has changed by operation of a new VM, is assumed. In a case where the present process does not exist, the memory collection is performed by detecting a decrease in the cache hit rate by the operation of the new VM. In a case where the present process exists, then the decrease in the cache hit rate is determined as a temporary decrease, and the adjustment of the memory allocation amount may be performed after confirming the cache hit status for a constant time.

REFERENCE SIGNS LIST

201 Physical resource
202 Virtualization control unit
203 Virtual machine
211 CPU
212 Memory
213 Device
221 Memory manager
222 Access trend determining mechanism
223 Virtual machine configuration information
231 Virtual CPU
232 Virtual memory
233 Virtual device
241 OS
251 Utilization status monitoring mechanism
252 Memory management mechanism
253 Balloon driver
254 File management mechanism
301 Virtual machine communication unit A
302 Allocation adjustment unit
303 Collection unit
304 Allocation unit
305 Table manipulation unit
306 Memory pool
307 Memory management table
308 Overall cache management table
309 Adjustment history
311 Virtual machine communication unit B
312 Characteristics determining unit
313 Policy
401 Hit rate calculation unit
402 Cache monitor unit
403 File monitor unit
404 Cache management table
405 IO monitor unit
406 Virtualization control unit communication unit

The invention claimed is:

1. A computer system comprising:
a plurality of virtual machines each having an OS;
a virtualization control unit which manages the plurality of the virtual machines;
a memory which is utilized by each OS at least in part as a cache region; and
a monitor unit which monitors a utilization status of the cache region by each OS;
wherein the virtualization control unit
manages an allocation region of the memory with respect to each OS,
decides the allocation region of the memory which becomes a collection target among the allocation region of the memory already allocated to each OS, based on the usage status of the cache region notified from the monitor unit, and
collects the allocation region of the memory which becomes the decided collection target from the OS which is a current allocation destination.

2. The computer system according to claim 1,
wherein the usage status of the cache region is a cache capacity used as the cache region and the cache capacity not being used, at a time on which a monitor request to the monitor unit from the virtualization control unit is received.

3. The computer system according to claim 1,
wherein the virtualization control unit
judges whether or not the OS with a necessity of the memory allocation exists, and in a case where the OS with the necessity of the allocation exists, then allocates the allocation region of the memory collected to the OS.

4. The computer system according to claim 3,
wherein the OS with the necessity of the memory allocation is the OS of a new virtual machine, in a case where a memory capacity which is necessary during generation of the new virtual machine cannot be secured.

5. The computer system according to claim 3,
wherein the OS with the necessity of the memory allocation is the OS of an existing virtual machine, in a case where a change amount of a cache hit rate of the cache region decreased to equal to or larger than a predetermined threshold value.

6. The computer system according to claim 5,
wherein the monitor unit calculates the cache hit rate based on a total amount of an IO size which is issued with respect to a file management unit that the OS has, and a total amount of an IO size which is issued with respect to the virtual device that the virtual machine with the OS has.

7. The computer system according to claim 5,
wherein the virtualization control unit
calculates the change amount, from the cache hit rate of the cache region which is utilized by each OS, which is notified from the monitor unit.

8. The computer system according to claim 1,
wherein in a case where an SLA (Service Level Agreement) is set to at least one of the plurality of the virtual machines,
the virtualization control unit requests for a determination on whether or not the virtual machine set with the SLA satisfies a condition of the SLA to the monitor unit, and removes a memory used by the OS that the virtual machine has from the memory as the collection target according to the result of the determination.

9. A memory allocation adjustment method of a computer system comprising:
a plurality of virtual machines each having an OS;
a virtualization control unit which manages the plurality of the virtual machines; and
a memory which is utilized by each OS at least in part as a cache region;
wherein the virtualization control unit has
a first step of calculating a collectable amount of the memory in each virtual machine from an allocated region as the cache region which is utilized by each OS of each virtual machine,
a second step of calculating a collection rate of each virtual machine, based on a capacity not being used in the cache region,
a third step of calculating a collection request amount with respect to each virtual machine, based on a necessary collection amount and the collection rate,
a fourth step of comparing the collectable amount and the collection request amount for each virtual machine,
a fifth step of setting the collectable amount as the collection amount from the allocation region of the memory for the virtual machine in which the collection request amount is larger than the collectable amount, and setting the collection request amount as the collection amount for the virtual machine in which the collectable amount is larger than the collection request amount, and a sixth step of requesting a collection of the set collection amount with respect to each virtual machine, and each OS of the virtual machine has a seventh step of collecting the requested collection amount from the allocation region of the memory.

\* \* \* \* \*